United States Patent
Constans et al.

(10) Patent No.: US 9,476,733 B2
(45) Date of Patent: Oct. 25, 2016

(54) METHOD AND SYSTEM FOR ASSISTING THE PILOTING OF AN AIRCRAFT

(71) Applicant: Airbus Operations (SAS), Toulouse (FR)

(72) Inventors: Florian Constans, Pibrac (FR); Patrice Rouquette, Pompertuzat (FR); Matthieu Aribert, Marseilles (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 51 days.

(21) Appl. No.: 14/666,849

(22) Filed: Mar. 24, 2015

(65) Prior Publication Data
US 2015/0276428 A1    Oct. 1, 2015

(30) Foreign Application Priority Data

Mar. 28, 2014 (FR) ...................... 14 52696

(51) Int. Cl.
*G01C 23/00* (2006.01)
*G08G 5/00* (2006.01)
(Continued)

(52) U.S. Cl.
CPC .......... *G01C 23/005* (2013.01); *G05D 1/0676* (2013.01); *G08G 5/0021* (2013.01); *G08G 5/0047* (2013.01); *G08G 5/025* (2013.01)

(58) Field of Classification Search
CPC ............. G01C 23/00–23/005; G01C 21/20; G08G 5/0047; G08G 5/025; G08G 5/0021; G08G 5/0017; G08G 5/003; G05D 1/0676; G05D 1/0202; G05D 1/042; G05D 1/0607; G05D 1/0653; G05D 1/0808; G05D 1/0816; G05D 1/101–1/102
USPC ........... 701/14, 4, 10, 16; 244/183; 340/971, 340/973, 979; 73/178 T
See application file for complete search history.

(56) References Cited

U.S. PATENT DOCUMENTS

| 5,592,382 A | * | 1/1997 | Colley | G01C 23/005 340/990 |
| 8,346,412 B2 | * | 1/2013 | Lacaze | G01C 23/00 244/187 |

(Continued)

FOREIGN PATENT DOCUMENTS

| FR | 2885439 | 11/2006 |
| FR | 2908220 | 5/2008 |

OTHER PUBLICATIONS

Value_Definition of Value by Merriam-Webster.pdf (Value | Definition of Value by Merriam-Webster, Jul. 7, 2016, http://www.merriam-webster.com/dictionary/value, pp. 1-18).*

(Continued)

*Primary Examiner* — Bao Long T Nguyen
(74) *Attorney, Agent, or Firm* — Greer, Burns & Crain, Ltd.

(57) ABSTRACT

A method for assisting the piloting of an aircraft landing on a runway comprising determining current flight conditions of the aircraft, determining, with the help of the current flight conditions, the following distances between projections, in a horizontal plane, of the current position of the aircraft and a position of contact with the ground: a minimum approach distance; a standard approach distance; and a distance to destination according to a predetermined flight path. The method includes placing the three distances in order according to their respective values, and displaying, along a scale of a screen in the aircraft cockpit, a first, a second and a third symbol respectively associated with the minimum approach distance, with the standard approach distance and with the distance to destination, these three symbols being placed in order on the scale according to the order of the distances with which they are associated.

8 Claims, 5 Drawing Sheets

(51) Int. Cl.
*G05D 1/06* (2006.01)
*G08G 5/02* (2006.01)

(56) References Cited

U.S. PATENT DOCUMENTS

| | | | |
|---|---|---|---|
| 8,396,614 B1 * | 3/2013 | Pschierer | G01C 23/00 701/14 |
| 8,793,039 B1 * | 7/2014 | Hammack | G01C 23/00 340/971 |
| 9,132,913 B1 * | 9/2015 | Shapiro | B64C 19/00 |
| 2006/0200279 A1 | 9/2006 | Ainsworth et al. | |
| 2008/0140272 A1 | 6/2008 | Zadrozynski et al. | |
| 2008/0154447 A1 * | 6/2008 | Spinelli | G01C 21/20 701/7 |
| 2008/0275642 A1 * | 11/2008 | Clark | G08G 5/0021 701/457 |
| 2010/0036551 A1 | 2/2010 | Lacaze et al. | |
| 2010/0131126 A1 * | 5/2010 | He | G01C 21/00 701/14 |
| 2010/0283636 A1 * | 11/2010 | Clark | G01C 23/00 340/971 |
| 2013/0013133 A1 * | 1/2013 | Walter | G08G 5/0021 701/11 |
| 2013/0218374 A1 * | 8/2013 | Lacko | G08G 5/025 701/16 |
| 2013/0345905 A1 * | 12/2013 | Parthasarathy | G01C 23/00 701/3 |
| 2014/0309821 A1 * | 10/2014 | Poux | G08G 5/0021 701/14 |
| 2014/0343765 A1 * | 11/2014 | Suiter | G08G 5/0056 701/18 |

OTHER PUBLICATIONS

French Search Report, Dec. 11, 2014.

* cited by examiner

METHOD AND SYSTEM FOR ASSISTING THE PILOTING OF AN AIRCRAFT

CROSS-REFERENCES TO RELATED APPLICATIONS

This application claims the benefit of the French patent application No. 1452696 filed on Mar. 28, 2014, the entire disclosures of which are incorporated herein by way of reference.

BACKGROUND OF THE INVENTION

The present invention relates to a method and a system for assisting the piloting of an aircraft during an operational flight phase in the course of which the aircraft is likely to land on a runway. Such an operational flight phase can notably correspond to an approach phase for the purpose of a landing on the runway. In order to land an aircraft, in particular a transport aircraft, on a runway, that aircraft flying at a current moment of time with a current energy, it is necessary to manage the dissipation of its energy during the approach to the runway in such a way that on the one hand the contact of the aircraft with the ground is not too abrupt and, on the other hand, once the aircraft is on the ground, it has sufficient braking capability to stop before an end of the runway. In order to do this, the landing procedures make provision for the aircraft to be in a state called a "stabilized state" when during its descent it reaches a predetermined height with respect to the ground, defined in the landing procedure chosen by the pilot. The predetermined height can for example be 1000 feet (about 300 meters) or 500 feet (about 150 meters). The stabilized state corresponds to stabilized approach conditions, which notably comprise a predetermined and stabilized approach speed and approach slope (that is to say they are constant over the course of time) defined in the landing procedure in question. These stabilized approach conditions must be maintained during the continuation of the approach to the runway, down to a height of for example 50 feet (about 15 meters) in direct proximity to the runway. The energy of the aircraft at a given time corresponds to the sum, on the one hand, of its potential energy because of the difference in height between the position of the aircraft at that time and the position of the runway and, on the other hand, of its kinetic energy at that time.

When a pilot of the aircraft wishes to fly such an operational phase during the course of which the aircraft is likely to land on a runway, it is desirable that he should have indicators in the cockpit of the aircraft allowing him to appreciate if it is possible to land the aircraft on that runway in good conditions. In particular, it is desirable that these indicators allow the pilot to appreciate if it is possible to manage a dissipation of the current energy of the aircraft during its approach to the runway making it possible to reach a stabilized state at said predetermined height, in order that, on the one hand, the contact with the ground is not too abrupt and, on the other hand, once the aircraft is on the ground, it has sufficient braking capability to stop before an end of the runway. The documents FR2885439 and FR2908220 describe the display of a first arc of a circle and of a second arc of a circle on a navigation screen in the cockpit, these two arcs of a circle, the first one corresponding to a minimum approach distance conforming with an optimized approach for reaching stabilized approach conditions and the second one corresponding to a standard approach distance conforming with a standard approach for reaching stabilized approach conditions, each of said distances being defined between projections in a horizontal plane of a current position of the aircraft and a position of contact of the aircraft with the ground. Said minimum approach distance conforming to an optimized approach corresponds to a strategy of maximum dissipation of the energy of the aircraft, and therefore to a maximum deceleration of the aircraft in consideration of its operational performance, in particular by applying optimized management of the aerodynamic configuration (air brakes . . . ) of the aircraft. The two arcs of a circle allow the pilot to better comprehend the capability of the aircraft to land on the runway in good conditions, by comparing the positions of said arcs of a circle with a position of the runway shown on the navigation screen. However, the display of said arcs of a circle on the navigation screen depends on the display extent (range) selected by the pilot for display on the navigation screen. If the display range selected by the pilot is not sufficient, these arcs of a circle cannot be displayed on the screen and the pilot is not therefore informed of the capability of the aircraft to land on the runway in good conditions. On the other hand, when the navigation screen is configured in ARC mode and the runway is situated behind the aircraft, the position of the runway is not displayed on the navigation screen. Even if the two arcs of a circle are displayed, they do not allow the pilot to appreciate the capability of the aircraft to land on the runway in good conditions since the latter is not shown on the screen. Such a situation is shown in FIG. 1. This figure shows a navigation screen of the ND (Navigation Display) type on which the following are displayed in the usual manner:

- a symbol 10 representing the current position of the aircraft;
- a usual distance scale 17, defined with respect to the current position of the aircraft illustrated by the symbol 10;
- a usual scale 16 of angular deviations;
- a plot 13 illustrating the theoretical fight path of the aircraft in projection in the horizontal plane, with waypoints 15.

On this screen are also shown, in front of the aircraft, the first arc of a circle C1 associated with the minimum approach distance and the second arc of a circle C2 associated with the standard approach distance. In the example shown in the figure, the runway is situated behind the aircraft and consequently it is not visible on the navigation screen. It is therefore difficult for the pilot to interpret the display of the two arcs of a circle C1 and C2.

SUMMARY OF THE INVENTION

The purpose of the present invention is to overcome the aforesaid disadvantages. It relates to a method for assisting the piloting of an aircraft during an operational flight phase in the course of which the aircraft is likely to land on a runway, a method according to which the following successive steps are carried out automatically and repetitively:

a) determination of current flight conditions of the aircraft;

b) determination, at least with the help of said current flight conditions, of the following approach distances which correspond to distances in a horizontal plane between projections in this horizontal plane of the current position of the aircraft and of a position of contact with the ground:

b1) a minimum approach distance conforming with an optimized approach for reaching stabilized approach conditions;

b2) a standard approach distance conforming with a standard approach for reaching the stabilized approach conditions; and c) display, on a screen in the cockpit of the aircraft, of a first symbol associated with the minimum approach distance and of a second symbol associated with the standard approach distance.

This method is noteworthy in that, throughout said operational flight phase of the aircraft:

step b) furthermore comprises the determination of the following distance:

b3) a distance to destination corresponding to a distance, in this horizontal plane, between projections in this horizontal plane of the current position of the aircraft and of a position of contact with the ground when the aircraft is following a predetermined flight path stored in a flight management computer of the aircraft, this predetermined flight path corresponding to a flight plan of the aircraft, and step c) comprises the following sub-steps:

c1) placing in order the minimum approach distance, the standard approach distance and the distance to destination according to their respective values; and c2) displaying, along a scale on said screen in the cockpit, the first symbol associated with the minimum approach distance, the second symbol associated with the standard approach distance and a third symbol associated with the distance to destination, these three symbols being placed in order on the scale as a function of the order, determined in sub-step c1), of the distances with which these symbols are associated.

Thus, according to this method, the three symbols associated with the minimum approach distance, with the standard approach distance and with the distance to the destination are displayed at all times during the operational flight phase. Given that these symbols are arranged on the scale according to the respective values of said distances, the pilot can easily appreciate, with one glance, the capability of the aircraft of reaching a stabilized state at said predetermined height for the purpose of landing on the runway in question. Thus, when the order of the symbols is such that the distance to the destination is greater than the standard approach distance, the aircraft is capable of reaching the stabilized state at the predetermined height, by following a standard approach. When the symbol associated with the distance to the destination is situated on the scale between the other two symbols, the distance to the destination is less than the standard approach distance, but is however greater than the minimum approach distance. The result of this is that the aircraft cannot reach the stabilized state at the predetermined height by following a standard approach. Obtaining the stabilized state at the predetermined height is however possible provided that there is, along the flight path between the present position of the aircraft and a position corresponding to the predetermined height, a greater dissipation of the energy of the aircraft than the energy dissipation corresponding to a standard approach. When the order of the symbols is such that the distance to the destination is less than the minimum approach distance, the aircraft is not capable of reaching the stabilized state at the predetermined height, even by applying a strategy of maximum dissipation of the energy, because the energy of the aircraft is too great. Thanks to the method according to the invention, the pilot can therefore know immediately and at any time, during the operational flight phase in question, if the aircraft is capable of reaching the stabilized state at the predetermined height and therefore of landing on the runway in good conditions.

Moreover, the pilot permanently has available, throughout said operational flight phase, the display of said symbols, whatever the display range selected by the pilot for the navigation screen may be.

Moreover, given that the invention provides the display of the third symbol associated with the distance to destination, as well as of the first symbol and of the second symbol on a same scale, it is easy for the pilot to compare the minimum approach distance and the standard approach distance with this distance to destination, even when the position of the runway is situated behind the aircraft.

Consequently, throughout said operational flight phase, the pilot has available at any time and whatever the circumstances may be, information allowing him to appreciate immediately, with one glance, the capability of the aircraft of landing on the runway in question in good conditions.

The method for assisting the piloting of an aircraft can furthermore comprise one or more of the following features, taken individually or in combination:

the screen is a navigation screen;

the scale is a straight horizontal or vertical scale;

the first, second and third symbols are shown on the scale at three predetermined positions;

each of the first, second and third symbols comprises a numerical value corresponding to the value of the distance with which it is associated.

According to a particular embodiment, said operational flight phase is an approach phase for the purpose of a landing on the runway.

The invention also relates to a system for assisting the piloting of an aircraft during an operational flight phase in the course of which the aircraft is likely to land on a runway, this system comprising:

a device for acquiring information configured to determine current flight conditions of the aircraft;

a central processing unit of the aircraft configured to determine, at least with the help of said current flight conditions, the following approach distances which correspond to distances in a horizontal plane between projections in this horizontal plane of the current position of the aircraft and a position of contact with the ground:

a minimum approach distance conforming with an optimized approach for reaching stabilized approach conditions;

a standard approach distance conforming with a standard approach for reaching the stabilized approach conditions; and a computer for managing the display configured to display, on a screen in the cockpit of the aircraft, a first symbol associated with the minimum approach distance and a second symbol associated with the standard approach distance.

This system is noteworthy in that the central processing unit and the display management computer are configured so that, throughout said operational flight phase of the aircraft:

the central processing unit furthermore determines the following distance:

a distance to destination corresponding to a distance, in a horizontal plane, between projections in this horizontal plane of the current position of the aircraft and of a position of contact with the ground when the aircraft is following a predetermined flight path stored in a flight management computer of the aircraft, this predetermined flight path corresponding to a flight plan of the aircraft, and the display management computer:
places in order the minimum approach distance, the standard approach distance and the distance to destination according to their respective values; and
displays, along a scale of said screen in the cockpit, the first symbol associated with the minimum approach distance, the second symbol associated with the standard approach distance and a third symbol associated with the distance to destination, these three symbols being placed in order on the scale according to the previously determined order of the distances with which these symbols are associated.

The invention also relates to an aircraft comprising a piloting assistance system such as mentioned above.

BRIEF DESCRIPTION OF THE DRAWINGS

The invention will be better understood on reading the following description and on examining the appended figures.

DETAILED DESCRIPTION OF THE PREFERRED EMBODIMENTS

Figure 1:
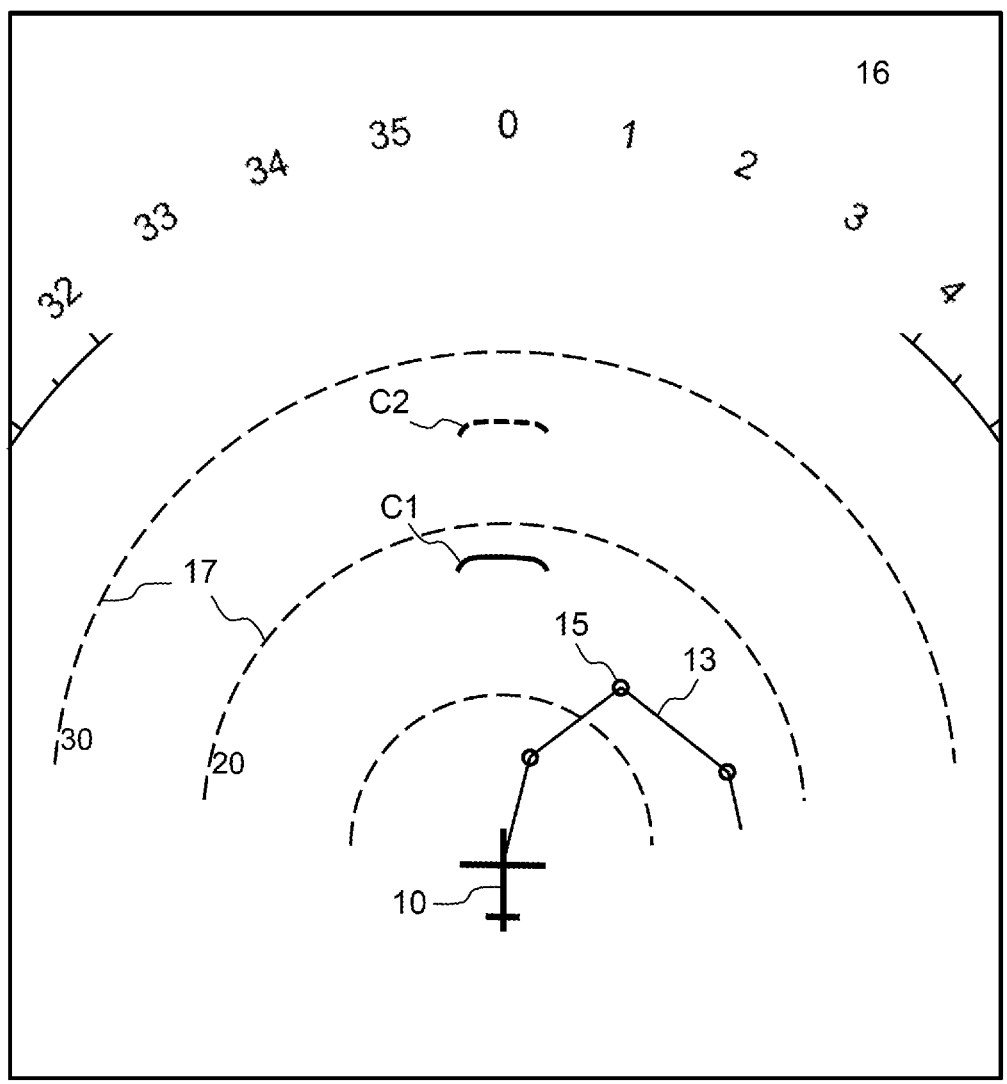
FIG. 1, already described, shows a display on a navigation screen of an aircraft, according to the prior art.
Figure 2:
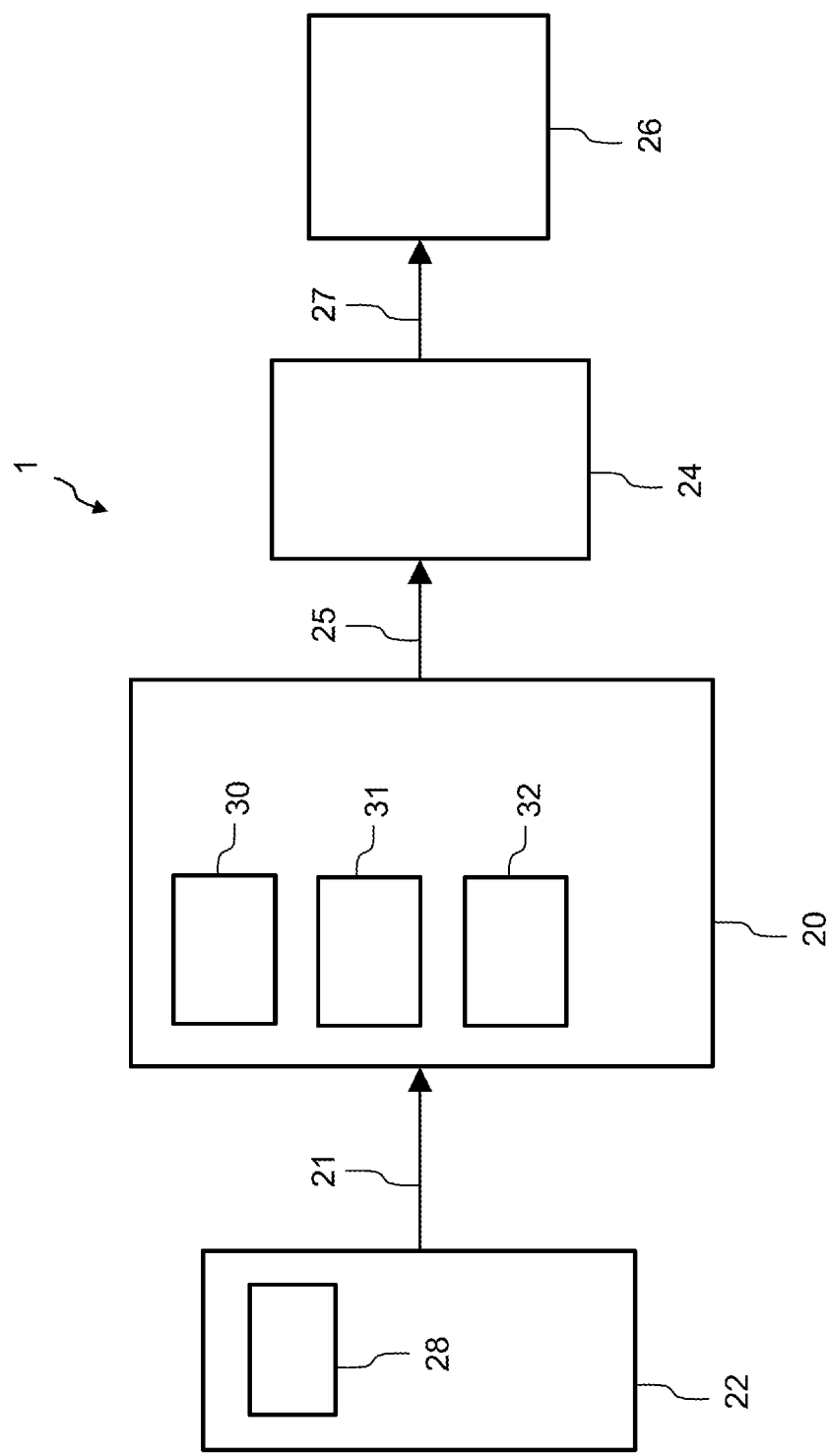
FIG. 2 is a block diagram of a system for assisting the piloting of an aircraft conforming to an embodiment of the invention.

The piloting assistance system 1, such as shown in FIG. 2, comprises a set 22 of information sources, a central processing unit 20 connected to the set 22 of information sources by a link 21, a display management computer 24 connected to the central processing unit 20 by a link 25 and a display screen 26 connected to the display management computer 24 by a link 27. The central processing unit 20 comprises a module 30 for calculating a minimum approach distance, a module 31 for calculating a standard approach distance and a module 32 for calculating a distance to destination. In a particular non-limiting embodiment of the invention:
the central processing unit 20 corresponds to a computer of the FMS (Flight Management System) type and the calculating modules 30, 31 and 32 are implemented in the form of software functions of the said flight management system computer;
the display management computer 24 is a computer forming part of a cockpit display of the CDS (Cockpit Display System) type of the aircraft; and
the screen 26 is a navigation screen of the ND (Navigation Display) type of said cockpit display system.

The set 22 of information sources comprises a calculating unit 28 configured to determine, in particular for measuring or estimating, the current flight conditions of the aircraft in the usual way. These current flight conditions of the aircraft comprise at least the height of the aircraft with respect to the ground, the speed of the aircraft and the aerodynamic configuration of the aircraft (notably the position of the slats and the flaps). Said information sources can for example comprise inertial measuring means of the IRS (Inertial Reference System) type, satellite locating means of the GNSS (Global Navigation Satellite System) type for example of the GPS type, radio altimeters, etc. The set of information sources 22 and the calculating unit 28 form a data acquisition device configured to determine the current flight conditions of the aircraft.

When operating, this data acquisition device determines said current flight conditions of the aircraft from information supplied by the various information sources of the set 22 of information sources and it transmits these current flight conditions of the aircraft to the central processing unit 20. In the central processing unit, the calculating module 30 determines a minimum approach distance which corresponds to a minimum distance between first and second projections on a horizontal plane, on the one hand of the present position of the aircraft and, on the other hand, of a position of contact of said aircraft with the ground, when the latter descends and decelerates from its current position according to an optimized approach for reaching stabilized approach conditions. As mentioned previously, this optimized approach corresponds to a maximum deceleration of the aircraft in compliance with its operational performance. The calculating module 31 determines a standard approach distance which corresponds to a distance between first and third projections on the horizontal plane, on the one hand of the current position of the aircraft and, on the other hand, of a position of contact of said aircraft with the ground, when the latter descends and decelerates from its current position, according to a standard approach for reaching said stabilized approach conditions. The determination of the minimum approach distance and of the standard approach distance, by the modules 30 and 31 respectively, will not be further described given that they are described in detail in the documents FR2885439 and FR2908220 to which those skilled in the art will be able to refer.

The calculating module 32 determines a distance to destination between first and fourth projections in the horizontal plane, on the one hand of the current position of the aircraft and, on the other hand, of a position of contact of said aircraft with the ground when the aircraft is following a predetermined flight path stored in a flight management computer of the aircraft. In practice, this predetermined flight path corresponds to a flight plan stored in a flight management computer of the aircraft. Said position of contact of the aircraft with the ground corresponds to the position of a point situated close to the threshold of a runway on which the aircraft is likely to land if it is guided along said predetermined flight path.

Figure 3:
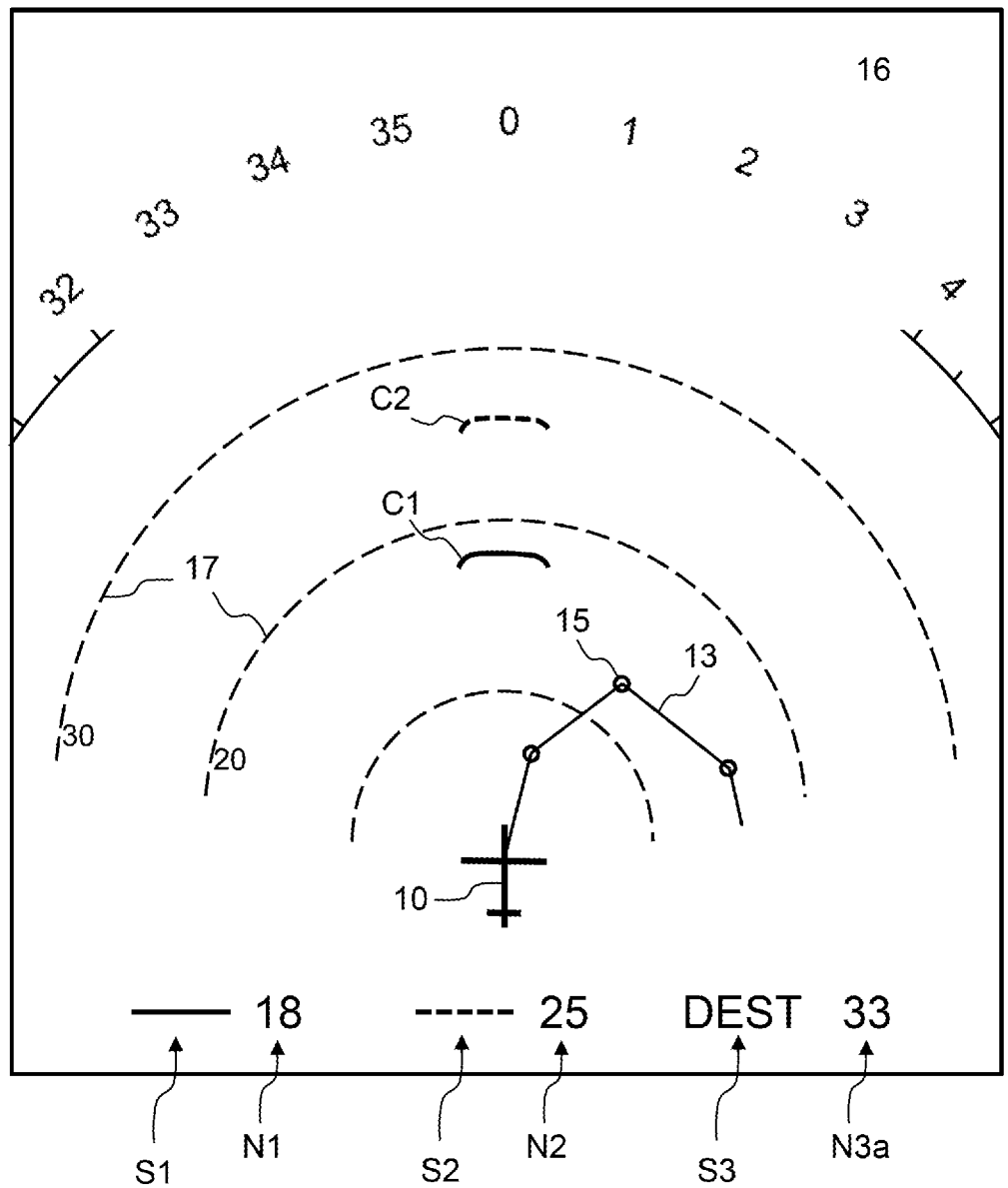
FIGS. 3, 4 and 5, show different displays on a navigation screen of an aircraft, conforming to an embodiment of the invention.

The central processing unit 20 transmits the minimum approach distance, the standard approach distance and the distance to destination to the display management computer 24. The latter determines an order of said three distances according to their respective values. As shown in FIG. 3, the display management computer 24 displays, along a scale of said screen in the cockpit, a first symbol S1 associated with the minimum approach distance, a second symbol S2 associated with the standard approach distance and a third symbol S3 associated with the distance to destination. These three symbols are placed in order on the scale according to the predetermined order of the distances with which these symbols are associated.

Thus, it is very easy for the pilot to see, with a single glance, how these three distances are placed in order. For example, in the case shown in FIG. 3, these distances are arranged on the scale in increasing order from left to right. Given that the third symbol S3 associated with the distance to destination is displayed in the most rightward position on this scale, the pilot can see immediately that the distance to destination is greater than the other two distances. From this he therefore deduces that the aircraft is capable of reaching a stabilized state at said predetermined height for the purpose of landing on the runway.

Figure 4:
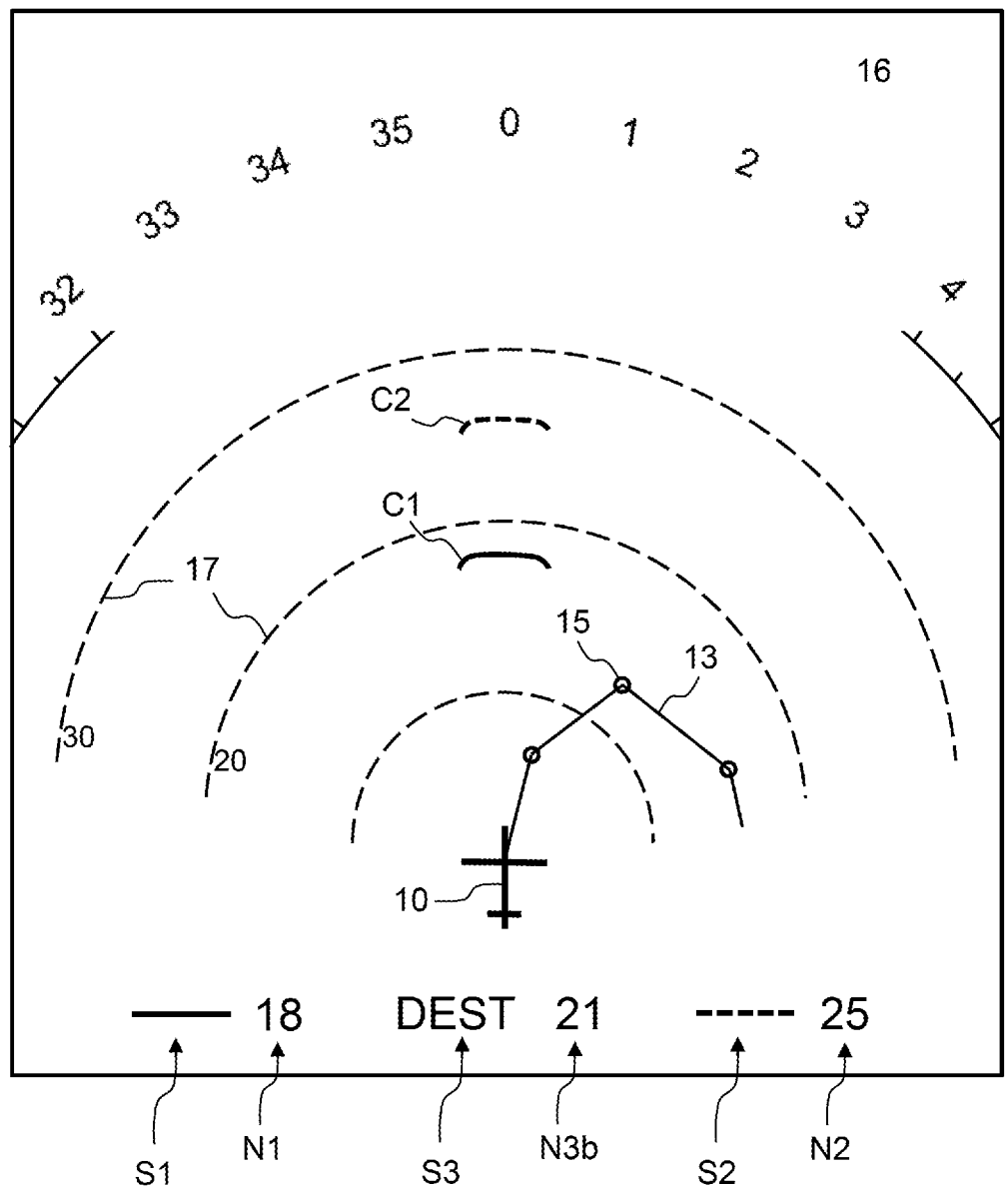

In the case shown in FIG. 4, the symbol S3 associated with the distance to destination is displayed between the symbol S1 associated with the minimum approach distance and the symbol S2 associated with the standard approach distance. The pilot immediately deduces from this that the aircraft is capable of reaching the stabilized state at the predetermined height provided that measures are taken so that, during the approach to the runway along the predetermined flight path, the reduction of the energy of the aircraft is greater than during a standard approach. These measures can for example consist of flying an optimized approach, for which the approach distance corresponds to the minimum approach distance. The latter is suitable for a landing in good conditions on the runway, since it is less than the distance to destination.

Figure 5:
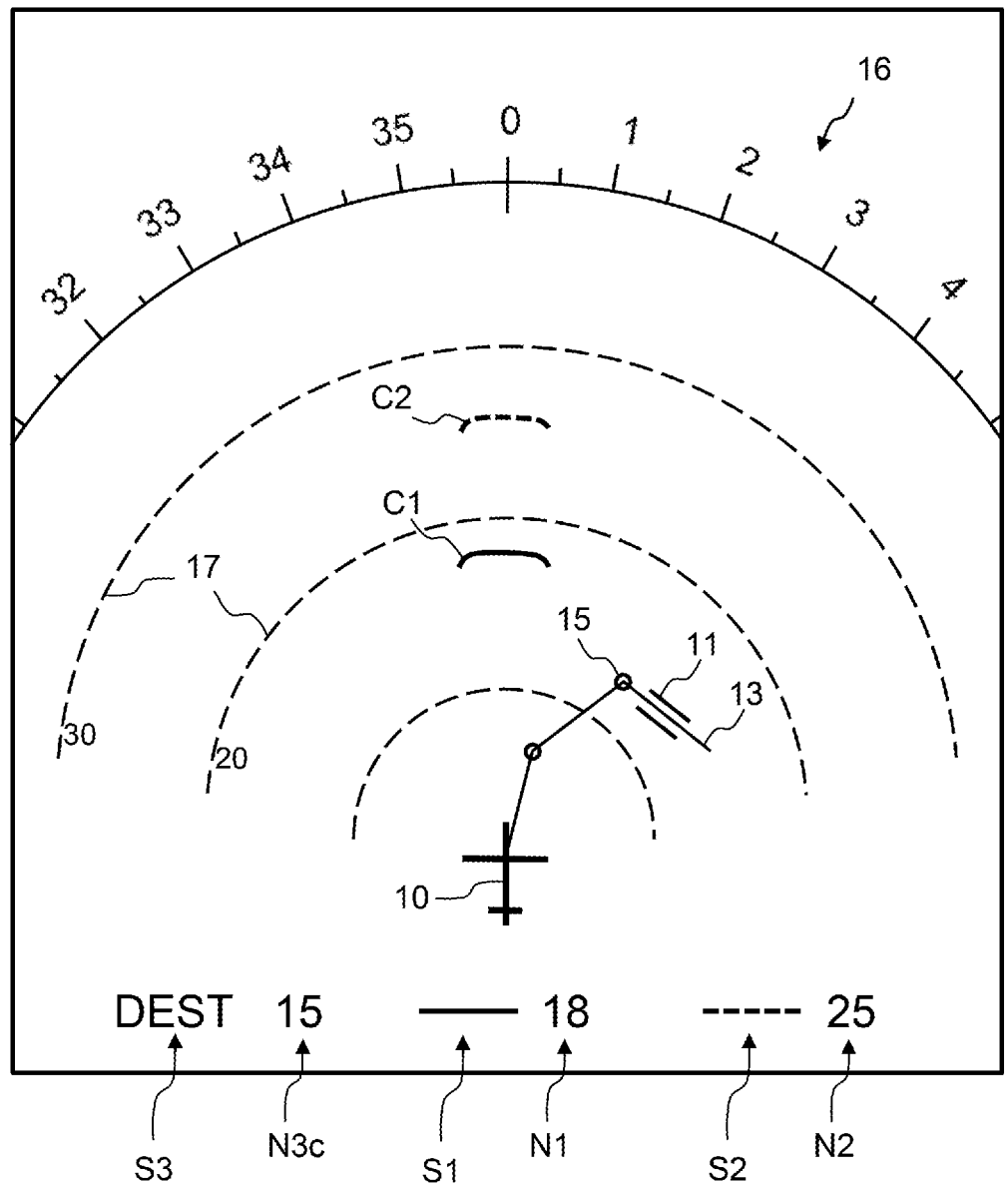

In the case shown in FIG. 5, the symbol S3 associated with the distance to destination is displayed in the most leftward position on the scale. The pilot can see immediately that the distance to destination is less than the other two distances. He therefore deduces from this that the aircraft cannot reach the stabilized state at the predetermined height for the purpose of landing on the runway. The pilot must therefore be aware immediately that he must implement measures to remedy this situation. These measures can for example comprise asking air traffic control for a lengthening of the predetermined flight path, corresponding to the flight plan, between the present position of the aircraft and the position of contact with the ground, which makes it possible to avoid a go-around which would involve abandoning the approach to the runway. Given the value of the distance to destination, a symbol 11 corresponding to the position of the runway is displayed on the screen.

In a preferred embodiment, the screen 26 is a navigation screen. This makes it possible to display the three symbols S1, S2 and S3 on the same screen as the circles C1 and C2 when the latter are displayed. It is however appropriate to note that the invention can also be used independently of the display of the circles C1 and C2 of the prior art on the navigation screen.

The example display shown in FIGS. 3, 4 and 5 provides a horizontal scale. Without departing from the scope of the invention, the scale can also be placed vertically. The increasing order of distances can equally well be from left to right or from right to left, for a horizontal scale, or from top to bottom or from bottom to top for a vertical scale.

Advantageously, each of the first, second and third symbols comprises a numerical value corresponding to the value of the distance with which it is associated. In the example shown in FIG. 3, the first symbol S1 comprises a numerical value N1, the second symbol S2 comprises a numerical value N2 and the third symbol S3 comprises a numerical value N3a. These numerical values correspond to distances of 18, 25 and 33 Nm (nautical miles) respectively (that is to say approximately 33, 46 and 61 kilometers). This makes it possible for the pilot to appreciate the margin available between the distance to destination and notably the standard approach distance. In the example, this margin is 8 Nm (that is to say approximately 15 kilometers). In the example shown in FIG. 4, the third symbol S3 comprises a numerical value N3b corresponding to a distance to destination of 21 Nm (that is to say approximately 39 kilometers). In the example shown in FIG. 5, the third symbol S3 comprises a numerical value N3c corresponding to a distance to destination of 15 Nm (that is to say approximately 28 kilometers). This value is 3 Nm (approximately 6 kilometers) lower than the value of the minimum approach distance, the numerical value N1 of which is 18 Nm. Thus, thanks to the display of the numerical values N1, N2 and N3a, the pilot can easily calculate that an increase of the distance to destination by 3 Nm is necessary in order to be able to land on the runway. This can allow him to ask air traffic control for an extension of said predetermined flight path by at least 3 Nm.

According to one embodiment of the invention, in order to improve the becoming aware of the situation by the pilot, the aspect of the display depends on the relative position of the third symbol S3, corresponding to the distance to destination, with respect to the first and second symbols S1 and S2. This aspect of the display can for example correspond to a fixed or flashing display, or to the use of different colors. For example, the three symbols S1, S2 and S3 can be displayed in green when the aircraft is capable of reaching the stabilized state at the predetermined height, as shown in FIG. 3. These symbols can be displayed in yellow when obtaining the stabilized state at the predetermined height is possible, provided that during the approach to the runway along said predetermined flight path the reduction of the energy of the aircraft is greater than during a standard approach, as shown in FIG. 4. Finally, these symbols can be displayed in red when the aircraft is not capable of reaching the stabilized state at said predetermined height, even by applying a strategy of maximum dissipation of the energy, as shown in FIG. 5.

Preferably, the three symbols S1, S2 and S3 are displayed on the scale at three predetermined positions, only the order of the three symbols being able to vary according to the respective values of the three distances with which these symbols are associated. This makes it possible to avoid continuous movement of said symbols along the scale. This results in better stability of the display, which facilitates reading by the pilot.

Again preferably, hysteresis is applied to the display of the three symbols S1, S2 and S3 when the difference between the values of the distances associated with two of said symbols is less in absolute value than a predetermined threshold. This makes it possible to improve the stability of the display by preventing said two symbols from oscillating between their two respective positions when the associated distances are substantially equal.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for assisting the piloting of an aircraft during an operational flight phase in the course of which the aircraft is likely to land on a runway, a method according to which the following successive steps are carried out automatically and repetitively:

a) determining current flight conditions of the aircraft;
b) determining, at least with the help of said current flight conditions, the following approach distances which correspond to distances in a horizontal plane between projections in this horizontal plane of the current position of the aircraft and of a position of contact with the ground:
   b1) a minimum approach distance conforming with an optimized approach for reaching stabilized approach conditions;
   b2) a standard approach distance conforming with a standard approach for reaching the stabilized approach conditions; and
c) displaying, on a screen in a cockpit of the aircraft, a first symbol associated with the minimum approach distance and a second symbol associated with the standard approach distance,
wherein, throughout said operational flight phase of the aircraft:
step b) furthermore comprises the determining the following distance:
   b3) a distance to destination, between projections in a horizontal plane of the current position of the aircraft and of a position of contact with the ground when the aircraft is following a predetermined flight path stored in a flight management computer of the aircraft, the predetermined flight path corresponding to a flight plan of the aircraft, and
step c) comprises the following sub-steps:
   c1) generating a first distance value associated with the minimum approach distance, a second distance value associated with the standard approach distance, and a third distance value associated with the distance to destination;
   c2) determining a placement sequence of the first, second, and third distance values in an increasing or decreasing order specified based on a corresponding numerical quantity of the first, second, and third distance values; and
   c3) displaying, along a scale on said screen in the cockpit, the first symbol associated with the minimum approach distance, the second symbol associated with the standard approach distance and a third symbol associated with the distance to destination, such that each symbol is displayed next to a respective distance value based on the increasing or decreasing order determined by the placement sequence of the first, second, and third distance values.

2. The method as claimed in claim 1, wherein the screen is a navigation screen.

3. The method as claimed in claim 1, wherein the scale is a straight horizontal or vertical scale.

4. The method as claimed in claim 1, wherein the first, second and third symbols are shown on the scale at three predetermined positions.

5. The method as claimed in claim 1, wherein each of the first, second and third symbols comprises a numerical number corresponding to each of the first, second, and third distance values.

6. The method as claimed in claim 1, wherein said operational flight phase is an approach phase for the purpose of a landing on the runway.

7. A system for assisting a piloting of an aircraft during an operational flight phase in the course of which the aircraft is likely to land on a runway, this system comprising:
   a device for acquiring information configured to determine current flight conditions of the aircraft;
   a central processing unit of the aircraft configured to determine, at least with the help of said current flight conditions, the following approach distances which correspond to distances in a horizontal plane between projections in this horizontal plane of the current position of the aircraft and a position of contact with the ground:
      a minimum approach distance conforming with an optimized approach for reaching stabilized approach conditions;
      a standard approach distance conforming with a standard approach for reaching the stabilized approach conditions; and
   a display management computer configured for managing the display configured to display, on a screen in a cockpit of the aircraft, a first symbol associated with the minimum approach distance and a second symbol associated with the standard approach distance,
   wherein the central processing unit and the display management computer are configured so that, throughout said operational flight phase of the aircraft:
   the central processing unit furthermore determines the following distance:
      a distance to destination between projections in this horizontal plane of the current position of the aircraft and of a position of contact with the ground when the aircraft is following a predetermined flight path stored in a flight management computer of the aircraft, this predetermined flight path corresponding to a flight plan of the aircraft, and
   the display management computer:
      generates a first distance value associated with the minimum approach distance, a second distance value associated with the standard approach distance, and a third distance value associated with the distance to destination;
      determines a placement sequence of the first, second, and third distance values in an increasing or decreasing order specified based on a corresponding numerical quantity of the first, second, and third distance values; and
      displays, along a scale of said screen in the cockpit, the first symbol associated with the minimum approach distance, the second symbol associated with the standard approach distance and a third symbol associated with the distance to destination, such that each symbol is displayed next to a respective distance value based on the increasing or decreasing order determined by the placement sequence of the first, second, and third distance values.

8. An aircraft comprising a system for assisting a piloting of an aircraft during an operational flight phase in the course of which the aircraft is likely to land on a runway, this system comprising:
   a device for acquiring information configured to determine current flight conditions of the aircraft;
   a central processing unit of the aircraft configured to determine, at least with the help of said current flight conditions, the following approach distances which correspond to distances in a horizontal plane between projections in this horizontal plane of the current position of the aircraft and a position of contact with the ground:

a minimum approach distance conforming with an optimized approach for reaching stabilized approach conditions;

a standard approach distance conforming with a standard approach for reaching the stabilized approach conditions; and a display management computer configured for managing the display configured to display, on a screen in a cockpit of the aircraft, a first symbol associated with the minimum approach distance and a second symbol associated with the standard approach distance, wherein the central processing unit and the display management computer are configured so that, throughout said operational flight phase of the aircraft:

the central processing unit furthermore determines the following distance:

a distance to destination between projections in this horizontal plane of the current position of the aircraft and of a position of contact with the ground when the aircraft is following a predetermined flight path stored in a flight management computer of the aircraft, this predetermined flight path corresponding to a flight plan of the aircraft, and the display management computer:

generates a first distance value associated with the minimum approach distance, a second distance value associated with the standard approach distance, and a third distance value associated with the distance to destination;

determines a placement sequence of the first, second, and third distance values in an increasing or decreasing order specified based on a corresponding numerical quantity of the first, second, and third distance values; and displays, along a scale of said screen in the cockpit, the first symbol associated with the minimum approach distance, the second symbol associated with the standard approach distance and a third symbol associated with the distance to destination, such that each symbol is displayed next to a respective distance value based on the increasing or decreasing order determined by the placement sequence of the first, second, and third distance values.

* * * * *